United States Patent [19]
D'Angelo

[11] 3,821,273
[45] June 28, 1974

[54] NOVEL DIALKYL PEROXYDICARBONATES

[75] Inventor: Antonio Joseph D'Angelo, Buffalo, N.Y.

[73] Assignee: Pennwalt Corporation, Philadelphia, Pa.

[22] Filed: July 30, 1970

[21] Appl. No.: 59,696

[52] U.S. Cl.. 260/463, 260/77.5 UA, 260/78.4 UA, 260/80 M, 260/88.3 R, 260/88.7 D, 260/89.1, 260/89.5 W, 260/89.7 R, 260/91.1 M, 260/91.5, 260/92.3, 260/93.5 C, 260/92.8 W, 260/93.5 W, 260/93.7, 260/94.2 R, 260/94.9 A, 260/94.9 CD

[58] Field of Search ..................................... 260/463

[56] References Cited
UNITED STATES PATENTS
2,370,588  2/1945  Strain................................ 260/453
3,720,700  3/1973  Norback............................ 260/463

FOREIGN PATENTS OR APPLICATIONS
1,957,434  6/1970  Germany
978,875  12/1964  Great Britain..................... 260/463

Primary Examiner—Lewis Gotts
Assistant Examiner—Diana G. Rivers
Attorney, Agent, or Firm—William D. Mitchell, Esq.

[57] ABSTRACT

Novel solid, thermally safe and stable di-n-alkyl (tridecyl, tetradecyl, pentadecyl or hexadecyl) peroxydicarbonates; and the use thereof in polymerizing ethylenically unsaturated monomers and in curing unsaturated polyester resin compositions.

4 Claims, No Drawings

NOVEL DIALKYL PEROXYDICARBONATES

BACKGROUND OF THE INVENTION

1. Field of Invention

This invention relates to novel solid, thermally safe and stable di-n-alkyl peroxydicarbonates (n=normal) which possess n-alkyl groups having 13–16 carbon atoms, and to improved processes for polymerizing ethylenically unsaturated monomers and for curing unsaturated polyester resins by employing as catalysts (initiators) said dialkyl peroxydicarbonates.

2. Related Art

The novel di-n-alkyl peroxydicarbonates of this invention possess greater thermal stability and are less hazardous than art-related peroxydicarbonates such as di-n-dodecyl peroxydicarbonate and IPP (diisopropyl peroxydicarbonate, a major commercially available peroxydicarbonate).

Strain in U.S. Pat. No. 2,370,588 discloses the preparations of various dialkyl peroxydicarbonates, including di-n-dodecyl (dilauryl) peroxydicarbonate. Di-n-octadecyl (stearyl) peroxydicarbonate is also listed. In U.S. Pat. No. 2,464,062, Strain also discloses that di-n-dodecyl peroxydicarbonate is a useful initiator for vinyl polymerizations. In Strain et al., J.A.C.S., 72, 1,254–1,263 (1950), Strain further describes properties of several dialkyl peroxydicarbonates as shown in Table II at page 1,255. None of the Strain publications list the peroxydicarbonates of the subject invention.

U.S. Pat. No. 3,312,678 describes vinyl polymerizations employing dialkyl peroxydicarbonate/tertiary aromatic amine systems as low temperature initiators. Di-n-dodecyl peroxydicarbonate is again listed as useful.

U.S. Pat. No. 3,373,150 discloses processes for homo-and copolymerizations of vinyl chloride employing dialkyl peroxydicarbonate/diacyl peroxide combination initiator systems. Di-n-dodecyl and di-n-octadecyl peroxydicarbonates are listed as being useful. The examples employ only dialkyl peroxydicarbonates having branched alkyl groups with 10 carbons or less. The alkyl group is stated to preferably contain 8–10 carbons.

U.S. Pat. No. 3,324,097 is similar to U.S. Pat. No. 3,373,150, except that no diacyl peroxides are employed. Instead, long chain aliphatic hydrocarbons, ethers and ketones are employed to reduce polymer "build-up" in polymerization vessels.

None of the above publications show the preparation and/or use of di-n-alkyl peroxydicarbonates in which the alkyl group contains more than 12 carbons. Di-n-octadecyl (distearyl) peroxydicarbonate is often listed, but neither its preparation nor use are shown.

BRIEF SUMMARY OF THE INVENTION

This invention concerns:

A. Thermally safe and stable di-n-alkyl peroxydicarbonates wherein the alkyl group has 13–16 carbons, namely di-n-tridecyl, di-n-tetradecyl, di-n-pentadecyl and di-n-hexadecyl peroxydicarbonate. Di-n-hexadecyl peroxydicarbonate,

is preferred; and

B. Improved processes for (1) polymerizing ethylenically unsaturated monomers (such as vinyl chloride) which are responsive at suitable temperatures (and pressures) to initiating amounts of free radical generators as polymerization initiators and (2) curing unsaturated polyester resin compositions at curing temperatures in the presence of initiating amounts of free radical polymerization initiators, the improvement residing in the use of the compounds of (A) as said initiator or curing agent.

DETAILED DESCRIPTION OF THE INVENTION

Dialkyl peroxydicarbonates are low temperature peroxides which are being increasingly used as low temperature free-radical polymerization initiators for ethylenically unsaturated monomers such as vinyl chloride. In the past diacyl peroxides such as di-n-dodecanoyl (lauroyl) peroxide and di-n-decanoyl (decanoyl) peroxide have been used as free-radical initiators in vinyl chloride polymerizations. However, since these are higher temperature peroxides, they have become less used and have been replaced by the lower temperature dialkyl peroxydicarbonates. The latter peroxides significantly cut down polymerization times, allowing a PVC (polyvinyl chloride) resin producer to make more polymer without having to invest in new plant equipment. The switch to the lower temperature dialkyl peroxydicarbonates was not made without problems, however. Dialkyl peroxydicarbonates, such as the major commercially available IPP (diisopropyl peroxydicarbonate), have stringent refrigerated storage and shipping requirements to maintain assay (active oxygen content) and must be handled for only a very short time at ambient temperatures (20°–25°C.) due to their thermally explosive nature. On the other hand, the here-to-fore used diacyl peroxides such as di-n-dodecanoyl peroxide do not require expensive refrigeration for storage and shipping nor do they present ambient temperature explosive hazards. Thus there is a need in the polyvinyl chloride industry (as well as in other polymer industries) for a cheap, room temperature stable and safe (no ambient temperature rapid decomposition hazard) dialkyl peroxydicarbonate.

It has now been discovered that the following di-n-alkyl peroxydicarbonates satisfy the above criteria:

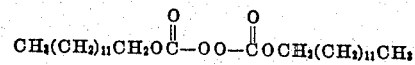

Di-n-tridecyl peroxydicarbonate,

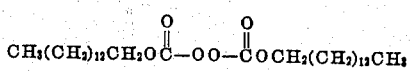

Di-n-tetradecyl peroxydicarbonate,

Di-n-pentadecyl peroxydicarbonate and

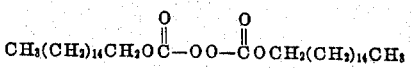

Di-n-hexadecyl peroxydicarbonate.

All of these dialkyl peroxydicarbonates are solids, are stable at room temperature, have no ambient temperature rapid decomposition hazards and are potentially cheap sources of free-radicals. Di-n-tetradecyl and di-n-hexadecyl peroxydicarbonates can be prepared from low cost and commercially available n-tetradecanol and n-hexadecanol, respectively, and di-n-tridecyl and di-n-pentadecyl peroxydicarbonates can be prepared from $C_{13}$ and $C_{15}$ "oxo" alcohols or from n-tridecanol and n-pentadecanol, respectively. Thus the dialkyl peroxydicarbonates of this invention are all economically attractive to produce. On the other hand, the next higher members, di-n-heptadecyl and di-n-octadecyl peroxydicarbonates, are not commercially attractive since the former is made from very expensive n-heptadecanol and the latter is obtained in low yields and assays and has a significantly lower activity on a weight basis than the dialkyl peroxydicarbonates of this invention. Furthermore, the latter, owing to manufacturing difficulties, will contain a significant amount of "inactive" organic material which will end up in the polymer when the latter is used as a free-radical initiator, hence lowering the quality and the utility of the resulting resin. In the case of the next lower member of this series of dialkyl peroxydicarbonates, di-n-dodecyl peroxydicarbonate is not thermally stable at room temperature and has significantly greater rapid decomposition hazards than the dialkyl peroxydicarbonates of this invention. Even though it is a solid (m.p. 30°–32°C.), di-n-dodecyl peroxydicarbonate loses all of its assay after one week at 30°C., whereas the dialkyl peroxydicarbonates of this invention lose no assay (see Example VIII). It also decomposes violently at 40°C. after 90 minutes whereas the dialkyl peroxydicarbonates of this invention are stable to rapid decompositions at 40°C., a temperature sometimes encountered in hot weather. The above results show that there is a sharp change in safety characteristics of dialkyl peroxydicarbonates (that is, from hazardous to nonhazardous) when going from di-n-dodecyl peroxydicarbonate to di-n-tridecyl peroxydicarbonate.

POLYMERIZATION

In the free-radical initiated polymerization of ethylenically unsaturated monomers, the subject dialkyl peroxydicarbonates are found to provide molar efficiencies equal to or better than IPP and other art-related dialkyl peroxydicarbonates.

Ethylenically unsaturated monomers include ethylene, propylene, styrene, alpha-methylstyrene, dichlorostyrene, p-chlorostyrene, vinyl naphthalene, vinyl phenol, vinyl toluene, vinylpyridine, divinylbenzene, acrylic acid and alpha-alkyl substituted acrylic acids such as methacrylic acid; the esters and amides of these unsaturated acids such as methyl acrylate, methyl methacrylate, butyl methacrylate, propyl acrylate, ethyl acrylate, 2-ethylhexyl acrylate, acrylamide and methacrylamide; the vinylidene halides such as vinylidene chloride, bromide and fluoride; vinyl esters of the inorganic acids, such as the halogen acids and hydrocyanic acid, as vinyl chloride, vinyl fluoride, vinyl bromide, acrylonitrile and methacrylonitrile; vinyl esters such as vinyl acetate, vinyl chloroacetate, vinyl benzoate, vinyl valerate, vinyl caproate, vinyl propionate, vinyl laurate, divinyl carbonate, divinyl succinate, divinyl adipate, vinyl allyl phthalate, vinyl methallyl pimelate, vinyl methyl glutarate, vinyl acrylate, vinyl crotonate and vinyl methacrylate; the vinyl ethers such as vinyl ethyl ether, vinyl butyl ether, vinyl allyl ether and vinyl methyl ether; the vinyl ketones such as vinyl butyl ketone and vinyl ethyl ketone; the allyl derivatives such as allyl acetate, allyl butyrate, diallyl phthalate, diallyl adipate, methallyl propionate, allyl chloride, methallyl chloride, allyl acrylate, methallyl methacrylate, allyl diglycol carbonate and diallyl carbonate; conjugated olefins such as butadiene, chloroprene and isoprene; acrolein; maleic anhydride; maleic acid and fumaric acid and their esters; and perhalo olefins such as tetrafluoroethylene, hexafluoropropylene and chlorotrifluoroethylene.

Temperatures of about 0°–80°C. are normally employed, with somewhat higher temperatures being employed in the case of high pressure ethylene polymerizations owing to pressure suppression of the rate of decomposition of the dialkyl peroxydicarbonates. The lower temperatures near 0°C. are used where it is desired to use activated systems of the type described in U.S. Pat. No. 3,312,678. The preferred temperature range is 35°–75°C.

Peroxide levels of about 0.003 to 0.300 percent or more by weight (preferably 0.01–0.20 percent), based on the polymerizable monomer, are normally employed in the polymerizations.

CURING OF POLYESTER RESINS.

In curing unsaturated polyester resin compositions by heating at suitable curing temperatures in the presence of free radical polymerization initiators, the use of the dialkyl peroxydicarbonates of this invention are found to give faster cures at low temperatures than dibenzoyl peroxide (an industry standard for polyester curing), in addition to their outstanding thermal stability characteristics.

Unsaturated polyesters which are used as the one component of the polyester resin compositions according to the present invention are, for instance, polyesters as they are obtained by esterifying preferably ethylenically unsaturated di-or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2'-dihydroxy ethyl ether); triethylene glycol (ethylene glycol bis-(2-hydroxy ethyl ether); propanediol-1,2; butanedion-1,3; 2,2-dimethyl propanediol-1,3; butene (2)-diol-1,4, glycerol, pentaerythritol, mannitol, and others. Mixtures of such acids and/or alcohols may also be used. The unsaturated di- or polycarboxylic acids may be replaced, at least partly, by saturated carboxylic acids such as adipic acid, succinic acid, sebacic acid, and others, or by aromatic dicarboxylic acids, such as phthalic acid, tetrahydrophthalic acid, and others and their anhydrides such as phthalic anhydride. The acids used as well as the alcohols employed may be substituted by other substituents, preferably by halogen. Examples of suitable halogenated acids are, for instance, tetrachloro phthalic acid; 1, 4, 5, 6, 7, 7 -hexachloro bicyclo (2,2,1) heptene (5)-2,3-dicarboxylic acid, and others, or their anhydrides.

The other component of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

A preferred resin composition contains as the polyester component the esterification product of propylene glycol (a polyalcohol), maleic anhydride (anhydride of an unsaturated dicarboxylic acid) and phthalic anhydride (anhydride of an aromatic dicarboxylic acid) and as the monomer component styrene.

Temperatures of about 20°–150°C. and peroxide levels of about 0.05 to 5.0 percent or more by weight of curable unsaturated polyester resin are normally employed.

In polymerization of the ethylenically unsaturated monomers, especially vinyl chloride polymerizations, it is further visualized that the long alkyl moieties of the subject dialkyl peroxydicarbonates will decrease their water solubility to such an extent that the formation of "emulsion" or "water phase" polyvinyl chloride will be diminished, thus decreasing the quantity of undesirable hard impenetrable polyvinyl chloride particles in the resin. Resin made from these peroxydicarbonates should therefore dissolve more easily and completely in standard solvents and plasticizers, and should extrude and form films free of such hard PVC particles.

EXAMPLES

The following examples serve to illustrate the subject invention but are not in limitation thereof.

EXAMPLE I PREPARATION OF DI-N-HEXADECYL PEROXYDICARBONATE

To a solution of 4.8g. (.12 mole) of NaOH and 100 ml. of water at 5°C was added 4.1g. (0.06 mole) of 50 percent $H_2O_2$. A solution of 31.3g. (0.10 mole) of n-hexadecyl chloroformate (97.5 percent assay) and 40 ml. of isopropanol was added slowly to the sodium peroxide solution at 5°C ± 2°C over a period of 1 hour and the reaction was allowed to stir an additional 4 hours at 5° to 10°C. The resulting mixture was poured into 800 ml. of cold water and the solid was separated by filtration. After washing several times with water the product was allowed to dry overnight at about 20°C. This gave 28.2g. of granular solid having an "active oxygen" content of 2.25 percent and an "active chlorine" content of 0.67 percent. Hence, the assay of the product was 80.5 percent and the chloroformate content was 5 to 6 percent. The product was washed with methanol at 5°C and the resulting dried product had an "active oxygen" content of 2.52 percent (90 percent assay), an active chlorine content of 0.28 percent about 2 percent chloroformate) and a melting point of 50° to 53°C. The recovery in the methanol wash was 85 percent, hence the overall corrected yield was 77 percent. A sample of this product recrystallized from methylene chloride had a melting point of 50° to 54°C and an assay of 97 percent acording to "active oxygen" content.

EXAMPLE II ALTERNATE PREPARATION OF DI-N-HEXADECYL PEROXYDICARBONATE

A 0.5 mole preparation of the title peroxide at 35°C, employing 700 ml. of hexane as a solvent for the n-hexadecyl chloroformate gave the desired product in 89 percent corrected yield, and having an assay of 98 percent (based on "active oxygen" content) and a melting point of 52°C.

EXAMPLE III PREPARATION OF DI-N-TRIDECYL PEROXYDICARBONATE FROM THE CHLOROFORMATE OF N-TRIDECYL ALCOHOL

The following essentially the same procedure as in Example I di-n-tridecyl peroxydicarbonate was prepared from n-tridecyl chloroformate in 55 percent corrected yield and had an assay of 98 percent (based on "active oxygen" content) and a melting point of 43° to 45°C.

EXAMPLE IV PREPARATION OF DI-N-TRIDECYL PEROXYDICARBONATE FROM THE CHLOROFORMATE OF $C_{13}$ OXO-ALCOHOL

To a solution of 7.4g. (0.11 mole) of 50 percent $H_2O_2$ and 30 ml. of $H_2O$ at 5°C was added a solution of 44.0g. (0.22 mole) of aqeous 20 percent sodium hydroxide solution over a period of 15 minutes. To this vigorously stirred solution at 10°C was added 52.4g. (0.20 mole) of the chloroformate prepared from a $C_{13}$ oxo-alcohol (about 50 percent n-tridecyl alcohol and 50 percent 2-methyldodecyl alcohol) and phosgene. The resulting mixture was allowed to stir for 3 hours and the temperature rose to 27°C. The product was then extracted with pentane and the pentane solution was cooled to −78°C. A white solid came out of solution and, after separation by filtration, 20g. (41 percent of theory) of product was obtained having an assay of 100 percent (based on "active oxygen" content) and a melting point of 45° C. A mixed melting point of this product with that of Example III (authentic di-n-tridecyl peroxydicarbonate) was taken. The results are shown below:

| No. | Peroxydicarbonate of | m.p., °C |
|---|---|---|
| 1 | This Example (IV) | 45 |
| 2 | Example III | 43–45 |
| 3 | 50/50 (weight/weight) 1/2 | 42–45 |

These results show that the product from this example is di-n-tridecyl peroxydicarbonate since no melting point depression was observed in the mixed melting point test.

EXAMPLE V PREPARATION OF DI-N-PENTADECYL PEROXYDICARBONATE FROM THE CHLOROFORMATE OF N-PENTADECYL ALCOHOL

Following essentially the same procedure used in Example I di-n-pentadecyl peroxydicarbonate was prepared from n-pentadecyl chloroformate in 56 percent corrected yield and had an assay of 92 percent (based on "active oxygen" content) and a melting point of 51° to 53°C.

EXAMPLE VI PREPARATION OF DI-N-PENTADECYL PEROXYDICARBONATE FROM THE CHLOROFORMATE OF $C_{15}$ OXO-ALCOHOL

Following essentially the same procedure employed in Example IV di-n-pentadecyl peroxydicarbonate was prepared from the chloroformate of a $C_{15}$ oxo-alcohol (about 50 percent n-pentadecyl alcohol and about 50 percent 2-methyltetradecyl alcohol). The product was obtained in 31 percent corrected yield and had an assay of 100 percent (based on "active oxygen" content) and a melting point of 52° to 53°C. A mixed melting point of this product with that of Example V (authentic di-n-pentadecyl peroxydicarbonate) was taken. The results are shown below:

| No. | Peroxydicarbonate of | m.p., °C |
|---|---|---|
| 1 | This Example (VI) | 52 to 53 |
| 2 | Example V | 51 to 53 |
| 3 | 50/50 (weight/weight) 1/2 | 50 to 53 |

These results show that the product from this example is di-n-pentadecyl peroxydicarbonate since no melting point depression was observed in the mixed melting point test.

EXAMPLE VII PREPARATIONS OF OTHER DI-N-ALKYL PEROXYDICARBONATES

Employing procedures similar to that in Example I several other di-n-alkyl peroxydicarbonates were prepared. The data from these preparations and those of Examples I through VI are summarized in Table I. The dialkyl peroxydicarbonates of this invention [Nos. 2(or 3), 4, 5(or 6) and 7 (or 8)] can be made from cheap and commercially available alcohols (n-tetradecyl alcohol and n-hexadecyl alcohol) or from oxo-alcohols that are currently being developed, consequently the dialkyl peroxydicarbonates of this invention are potentially cheap. The low yeild and assay obtained for di-n-octadecyl peroxydicarbonate (No. 9, a peroxide mentioned in the prior art), and the lower theoretical activity of this dialkyl peroxydicarbonate shows that it is considerably more expensive to make and considerably less attractive to polyvinyl chloride resin manufacturers than the dialkyl peroxydicarbonates of this invention.

TABLE I

Preparations of Di-n-Alkyl Peroxydicarbonates

| Alcohol Used for Prep. of Chloroformate | No. | Assay, % | Corr. Yield, % | m.p., °C |
|---|---|---|---|---|
| n-dodecyl | 1 | 99 | 86 | 30 to 32 |
| n-tridecyl | 2 | 98 | 55 | 43 to 45 |
| $C_{13}$ oxo-alcohol | 3 | 100 | 41 | 45[1.] |
| n-tetradecyl | 4 | 98 | 68 | 43 |
| n-pentadecyl | 5 | 92 | 56 | 51 to 53 |
| $C_{15}$ oxo-alcohol | 6 | 100 | 31 | 52 to 53[2.] |
| n-hexadecyl | 7[4.] | 90 | 77 | 50 to 53[3.] |
| n-hexadecyl | 8[5.] | 98 | 89 | 52 |
| n-octadecyl | 9 | 59 | 59 | 64 |

1. Solid portion of the peroxydicarbonate isolated
2. Solid portion of the peroxydicarbonate isolated
3. 97% assay material, m.p. 50 to 54°C.
4. From Example I
5. From Example II

EXAMPLE VIII 30°C. AND 40°C. THERMAL STABILITY AND SAFETY TESTS

25 Gram samples of various dialkyl peroxydicarbonates were placed in thermostatted chambers held at 30°C. and 40°C. After various intervals of time (1 week, 2 weeks and 4 weeks at 30°C. and up to 1 week at 40°C). the percent loss of assay (active oxygen content) was noted. In addition, the thermal rapid decomposition character of the dialkyl peroxydicarbonate was noted. These data are summarized in Table II. The thermal stability data show that the dialkyl peroxydicarbonates of this invention (Nos. 3, 4, 5, 6 and 6a in Table II) are stable at 30°C. for one to four weeks, whereas the art-related dialkyl peroxydicarbonates (Nos. 1 and 2) lose practically all of their activity at 30°C. in less than one week. In fact, IPP (No. 1) decomposed violently at 30°C. after 10 to 15 minutes. Even in the case of a rather impure sample (No. 6a) of di-n-hexadecyl peroxydicarbonate (81 percent assay, m.p. 43° to 50°C.) there was little loss of assay after 4 weeks at 30°C. At 40°C. after one week, di-n-hexadecyl peroxydicarbonate (No. 6) lost only 4 percent of its assay, a phenomenal observation in view of the fact that its half-life at 50°C. in trichloroethylene is 9.9 hours and (from this) its estimated half-life at 40°C. is about 40 hours. With respect to safety, the dialkyl peroxydicarbonates of this invention are stable to rapid decomposition at 30°C. and 40°C. whereas IPP (No. 1) decomposes violently after 10 to 15 minutes at 30°C. and di-n-dodecyl peroxydicarbonate decomposes violently after 90 minutes at 40°C.

TABLE II

30°C and 40°C Thermal Stability and Safety Tests

| | | | | Thermal Stability Tests | | | | Safety Tests[a] at | |
|---|---|---|---|---|---|---|---|---|---|
| | | Assay | m.p., | 30°C | 30°C | 30°C | 40°C | | |
| No. | Peroxydicarbonate | % | °C | 1 wk | 2 wks | 4 wks | 1 wk | 30°C | 40°C |
| | | | | % of Assay Lost at | | | | | |
| 1. | Diisopropyl (IPP) | 100 | 8 to 10 | 100 | 100 | 100 | 100 | Decomposes violently after 10 to 15 mins. | |
| 2. | Di-n-dodecyl | 99 | 30 to 32 | 96 | | | 100[b] | Stable to rapid decomposition | Decomposes violently after 90 minutes |
| 3. | Di-n-tridecyl | 98 | 43 to 45 | 0 | 0 | 0 | 3.4[c] | Stable to rapid decomposition | Stable to rapid decomposition |

TABLE II – Continued

30°C and 40°C Thermal Stability and Safety Tests

| | | | | Thermal Stability Tests | | | | |
|---|---|---|---|---|---|---|---|---|
| | | | | % of Assay Lost at | | | | Safety Tests[a] at |
| No. | Peroxydicarbonate | Assay % | m.p., °C | 30°C 1 wk | 30°C 2 wks | 30°C 4 wks | 40°C 1 wk | 30°C | 40°C |
| 4. | Di-n-tetradecyl | 98 | 43 | 0 | 0 | 0 | | Stable to rapid decomposition | |
| 5. | Di-n-pentadecyl | 92 | 51 to 53 | 0 | 0 | 0 | | Stable to rapid decomposition | |
| 6. | Di-n-hexadecyl | 97 | 50 to 54 | 0 | 0 | 0 | 4 | Stable to rapid decomposition | Stable to rapid decomposition |
| 6a. | Di-n-hexadecyl | 81 | 43 to 50 | | | | 1.5 | Stable to rapid decomposition | Stable to rapid decomposition |

Crossed-out entry, such as , means that the data for the entry was not obtained.
[a]Safety tests at 40°C were done on 10 g. samples of peroxides.

These data show that there is a very sharp and unexpected improvement in thermal stability and safety of peroxydicarbonates when one goes from di-n-dodecyl peroxydicarbonate to di-n-tridecyl peroxydicarbonate (and other dialkyl peroxydicarbonates of this invention). Hence the dialkyl peroxydicarbonates of this invention are safer to store, ship and handle than the prior art dialkyl peroxydicarbonates.

EXAMPLE IX VINYL CHLORIDE SUSPENSION POLYMERIZATION EFFICIENCIES OF DIALKYL PEROXYDICARBONATES

Vinyl chloride suspension polymerizations were run at 50°C for 8 hours in order to determine the amounts of initiators required at 90 percent conversion of vinyl chloride. The following recipe was employed in these polymerizations:

| Ingredient | Parts by Weight |
|---|---|
| Vinyl chloride monomer | 100 |
| Water (triple distilled) | 130 |
| Methocel Grade 65 HG, 50 cps* (1% aqueous soln.) | 60 |
| Aerosol MA** (1% aqueous soln.) | 60 |
| Free-radical initiator | variable |

*Methylcellulose, manufactured by Dow Chemical Co.
**Sodium salt of dihexyl sulfosuccinate, manufactured by American Cyanamide Co.

PROCEDURE

Pop bottles are employed and water, aqueous Methocel and aqueous Aerosol MA are added to each bottle and the contents are frozen at −20°C. To the bottles containing the frozen aqueous phase are added varying amounts of free-radical initiator (several bottles for each initiator) and the required amount of liquid vinyl chloride monomer (at −14°C). The bottles are crown-capped, enclosed in safety cages and placed in constant temperature bottle polymerizer maintained at 50°C. End-over-end tumbling at a rate of 25 revolutions per minute is employed for agitation and the polymerizations are allowed to proceed for 8 hours. At the end of that time the bottles in the safety cages are removed, cooled to 0°C. and vented of vinyl chloride monomer. Venting of unreacted vinyl chloride monomer seldom takes more than 15 to 30 minutes, hence, post polymerization is insignificant.

The amount of polymer produced is determined gravimetrically (by difference in weight) and plots of initiator required versus percent conversion are constructed for each initiator and the amount of initiator (in grams and in moles) required at 90 percent conversion is noted. These data for the dialkyl peroxydicarbonates of this invention, art dialkyl peroxydicarbonates and dilauroyl peroxide (a diacyl peroxide used commercially in vinyl chloride) are shown in Table III. These data show that, on a molar basis, the dialkyl peroxydicarbonates of this invention (Nos. 3, 4, 5 and 6 in Table III) are more efficient than or are as efficient as the prior art dialkyl peroxydicarbonates (Nos. 1 and 2) and are 10 times as

TABLE III

50°C/8 Hour Vinyl Chloride Suspension Polymerization

| No. | Peroxydicarbonate or Other Peroxide | Initiator Required at 90% Conv./100g. VCL | |
|---|---|---|---|
| | | Grams | Moles × 10⁴ |
| 1 | Diisopropyl | 0.031 | 1.53 |
| 2 | Di-n-dodecyl | 0.057 | 1.23 |
| 3 | Di-n-tridecyl | 0.059 | 1.22 |
| 4 | Di-n-tetradecyl | 0.070 | 1.36 |
| 5 | Di-n-pentadecyl | 0.067 | 1.24 |
| 6 | Di-n-hexadecyl | 0.073 | 1.27 |
| 7 | Dilauroyl peroxide | 0.550 | 13.81 | efficient as is dilauroyl peroxide (No. 7). On a weight basis the dialkyl peroxydicarbonates of this invention are 8 to 9 times as efficient as dilauroyl peroxide. Since safety as well as weight efficiencies of initiators must be considered when selecting a catalyst, indications are that PVC manufacturers would select a dialkyl peroxydicarbonate such as di-n-hexadecyl peroxydicarbonate over IPP or the di-n-dodecyl peroxydicarbonate owing to its greater safety (and stability), and its still much greater efficiency in vinyl chloride suspension polymerizations than dilauroyl peroxide (industry standard).

EXAMPLE X 82°C. SPI EXOTHERMS OF DIALKYL PEROXYDICARBONATES

Cure characteristics of the dialkyl peroxydicarbonates of this invention were determined in an unsaturated polyester resin. The basic unsaturated polyester resin was a mixture of an unsaturated polyester and styrene monomer.

The unsaturated polyester was an alkyld resin made by esterifying the following components:

| Component | Quantity |
|---|---|
| Maleic anhydride | 1.0 mole |
| Phthalic anhydride | 1.0 mole |
| Propylene glycol | 2.2 moles |
| Inhibitor added (hydroquinone) | 0.013% * |

(* - weight % based on total weight of polyester). The alkyld resin had an Acid No. of 45–50. Seven (7) parts by weight of the above polyester (alkyd resin) was diluted with three (3) parts by weight of monomeric styrene. The resulting unsaturated polyester resin had the following properties:

a) Viscosity (Brookfield No. 2 at 20 r.p.m.)     13.08 poise
b) Specific gravity     1.14

CURING PROCEDURE

Gelation and cure characteristics of various initiators in the unsaturated polyester resin were determined using the Standard SPI Exotherm procedure ("SPI Procedure for Running Exotherm Curves — Polyester Resins," published in the Preprint of the 16th Annual Conference — Reinforced Plastics Division Society of the Plastics Industry, Inc., February 1961).

Using this procedure at 82°C. (180°F.) the dialkyl peroxydicarbonates of this invention were employed to cure the basic unsaturated polyester resin. Levels of peroxides equivalent in "active oxygen" content to 1 percent by weight of curable resin of dibenzoyl peroxide (industry standard) were employed. The SPI Exotherm data for the dialkyl peroxydicarbonates of this invention and dibenzoyl peroxide are shown in Table IV. These results show that the dialkyl peroxydicarbonates of this invention (Nos. 1, 2, 3 and 4 of Table IV) are also useful for curing of unsaturated polyester resins, and give much faster cures at low temperatures than the conventional dibenzoyl peroxide.

TABLE IV

82°C. (180°F.) SPI Exotherms
(At "Active Oxygen" Levels Equivalent to 1.0% Dibenzoyl Peroxide)

| No. | Peroxydicarbonate or Other Peroxide | Gel, Min. | Cure, Min. | Peak Exo. °F. | Barcol |
|---|---|---|---|---|---|
| 1 | di-n-tridecyl | 0.2 | 1.0 | 365 | 35 |
| 2 | di-n-tetradecyl | 0.2 | 1.1 | 355 | 30-35 |
| 3 | di-n-pentadecyl | 0.2 | 1.0 | 380 | 20 |
| 4 | di-n-hexadecyl | 0.4 | 1.2 | 380 | 20 |
| 5 | dibenzoyl peroxide | 3.8 | 5.4 | 400 | 40-45 |

What is claimed is:

1. Thermally safe and stable dialkyl peroxydicarbonates selected from di-n-tridecyl peroxydicarbonate, di-n-tetradecyl peroxydicarbonate and di-n-pentadecyl peroxydicarbonate.

2. Di-n-tridecyl peroxydicarbonate.

3. Di-n-tetradecyl peroxydicarbonate.

4. Di-n-pentadecyl peroxydicarbonate.

\* \* \* \* \*

UNITED STATES PATENT OFFICE
CERTIFICATE OF CORRECTION

Patent No. 3,821,273          Dated June 28, 1974

Inventor(s) Antonio Joseph D'Angelo

It is certified that error appears in the above-identified patent and that said Letters Patent are hereby corrected as shown below:

Column 9, at about line 15, there should be added the following footnotes to the bottom of Table II:

--b. Complete loss of assay due to violent decomposition.
 c. Assay lost after 24 hours at 40°C--.

Column 10, lines 57 and 64, "alkyld" should read --alkyd--.

Signed and sealed this 22nd day of October 1974.

(SEAL)
Attest:

McCOY M. GIBSON JR.
Attesting Officer

C. MARSHALL DANN
Commissioner of Patents